G. BONNET.
INSECT TRAP.
APPLICATION FILED APR. 17, 1920.
1,353,310. Patented Sept. 21, 1920.
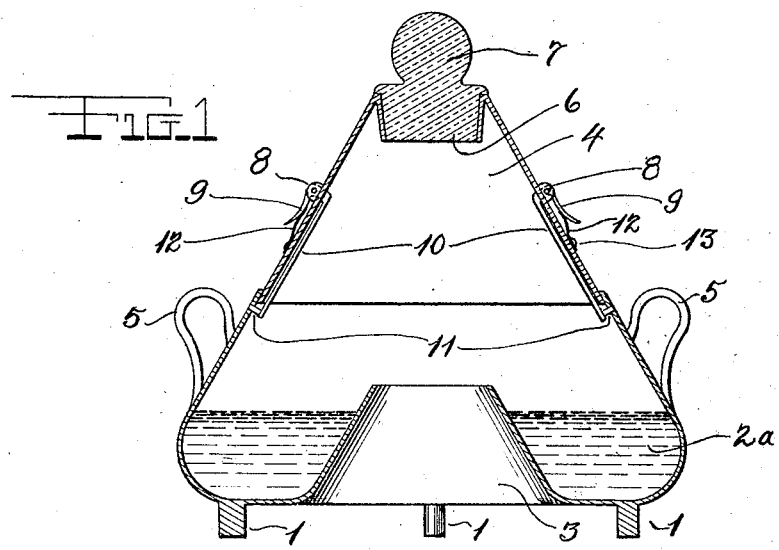
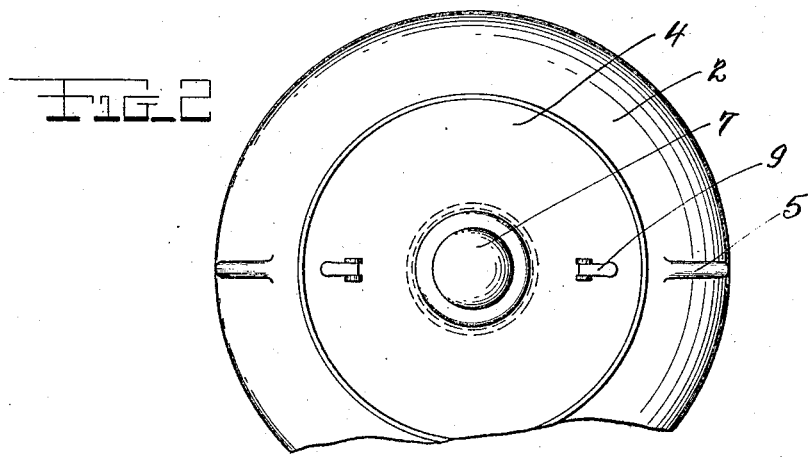
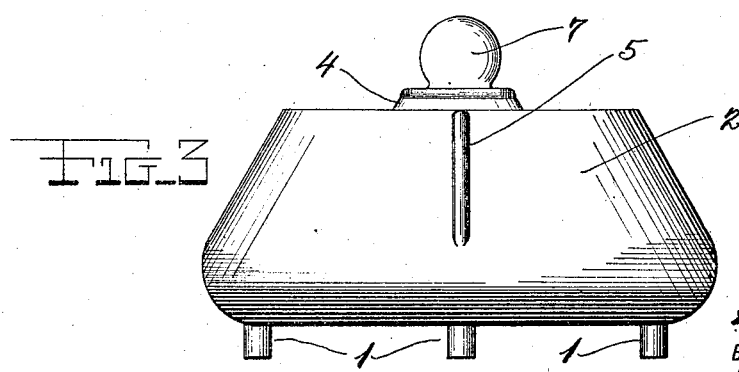
INVENTOR
Gottlieb Bonnet
BY
J. Lederman
ATTORNEY

UNITED STATES PATENT OFFICE.

GOTTLIEB BONNET, OF LINCOLN VALLEY, NORTH DAKOTA.

INSECT-TRAP.

1,353,310.  Specification of Letters Patent.  Patented Sept. 21, 1920.

Application filed April 17, 1920. Serial No. 374,548.

*To all whom it may concern:*

Be it known that I, GOTTLIEB BONNET, citizen of the United States, and resident of Lincoln Valley, in the county of Sheridan and State of North Dakota, have invented certain new and useful Improvements in Insect-Traps, of which the following is a specification.

This invention relates to insect traps, and has for its main object the provision of such a trap which is effective in catching and entrapping insects, particularly flying insects such as flies.

Another object of the invention is to provide such a trap which is simple in construction and use, and which is separable for access to the interior thereof for the purpose of cleaning the same from time to time.

Still another object of the invention is to provide a trap which is collapsible into a smaller volume for the purpose of storing the same in a small place during the winter months.

The above and other objects will become apparent in the description below, in which like characters of reference refer to like-named parts in the drawings.

Referring briefly to the drawings, Figure 1 is a central longitudinal cross-sectional elevational view of my device.

Fig. 2 is a plan view of the same.

Fig. 3 is an elevational view of the same collapsed.

Referring now in detail to the drawings, the numeral 1 represents the feet or legs supporting the lower body portion 2 which is annular in form, as shown having an entrance 3 in the center thereof communicating with the interior. The walls of said entrance rise to the height shown, and in the annular chamber within said portion 2 is placed a volume of liquid 2ª as molasses, syrup, sweetened water, or the like, to a level slightly below the height of said walls. Handles 5 are attached to the body 2, as shown.

In the interior of the side walls of the body 2, near the top thereof, are slots or recesses for the reception of pins 11 attached to members 10 secured in the upper body member 4, as follows. A curved handle 9 is pivotally mounted in ears 8 on each side of the body 4, and said members 10 are rigid to said latches 9, the former passing through openings in the walls of the body. Spring bands 12 normally urge said handles 9 away from the body 4, thus also normally urging the pins 11 into the slots in the walls of the member 2. Thereby the upper body portion 4 is held in position upon the lower body portion 2, providing an integral closed body having a single large chamber therein. The springs 12 are attached by means of rivets or screws 13. An opening 6 is provided in the peak of the upper body 4, into which a stopper or lid 7 is adapted to rest, in order to close the chamber within the body. Said stopper is of glass or other transparent material, and the body portions 2 and 4 are of opaque material.

In use, the insects will be attracted to the underside of the device by the odor arising from the liquid 2ª and escaping through the entrance 3. Thus, upon the insects going under said entrance, they will be further lured by the light appearing in the top of the device through the glass stopper 7; it is well known that insects are attracted by light. Thereupon the insects will enter the chamber through the entrance 3, and will alight upon the stopper 7 or upon the side walls of the chamber. Should they then attempt to walk down the said walls, they will be caught in the liquid. And it is thus that they would be entrapped, for they will not have the intelligence to fly out again through the opening 3, particularly because the latter appears dark from within the chamber.

In order to clean the device, the handles 9 are simply depressed by the finger, and the upper body 4 is lifted from the lower body 2. In order to collapse the device for winter storage, said upper body 4 is then dropped into the lower body, as illustrated in Fig. 3.

I claim:

A device of the class described comprising a lower body portion substantially annular in form, a central entrance thereinto from the underside thereof, a chamber provided in said body for holding liquid therein, an upper body portion adapted to rest upon said lower body portion so as to inclose a single chamber, an opening in the top of said second body portion, a transparent stopper adapted to fit into said opening, and means for releasably holding said upper body portion upon said lower body portion comprising latches pivotally mounted on the outside of said upper body portion, springs normally urging said latches outward, slots in the inside walls of said lower body portion, members rigid to said handles on the inside of said single chamber, pins near the extremities of said members, said pins adapted to engage said slots.

Signed at Lincoln Valley, in the county of Sheridan and State of North Dakota, this 30th day of March, A. D. 1920.

GOTTLIEB BONNET.